United States Patent
Butler et al.

(10) Patent No.: US 9,370,921 B2
(45) Date of Patent: Jun. 21, 2016

(54) COMPOSITE RADIUS FILLERS AND METHODS OF FORMING THE SAME

(71) Applicant: The Boeing Company, Seal Beach, CA (US)

(72) Inventors: Geoffrey A. Butler, Seattle, WA (US); Paul S. Nordman, Renton, WA (US)

(73) Assignee: The Boeing Company, Chicago, IL (US)

( * ) Notice: Subject to any disclaimer, the term of this patent is extended or adjusted under 35 U.S.C. 154(b) by 890 days.

(21) Appl. No.: 13/666,959

(22) Filed: Nov. 1, 2012

(65) Prior Publication Data

US 2015/0367619 A1 Dec. 24, 2015

(51) Int. Cl.
*B32B 5/28* (2006.01)
*B32B 37/14* (2006.01)
(Continued)

(52) U.S. Cl.
CPC .............. *B32B 37/142* (2013.01); *B29C 70/32* (2013.01); *B29C 70/545* (2013.01); *B29D 99/0003* (2013.01); *B32B 3/28* (2013.01); *B32B 5/12* (2013.01); *B64C 3/182* (2013.01); *B64C 3/26* (2013.01); *B29C 65/4835* (2013.01); *B29C 65/5014* (2013.01); *B29C 65/5021* (2013.01); *B29C 65/5057* (2013.01); *B29C 65/5064* (2013.01); *B29C 65/5078* (2013.01); *B29C 66/112* (2013.01); *B29C 66/131* (2013.01); *B29C 66/43441* (2013.01); *B29C 66/721* (2013.01); *B29C 66/72141* (2013.01); *B29C 66/7392* (2013.01); *B29C 66/7394* (2013.01); *B29L 2031/001* (2013.01); *B29L 2031/3076* (2013.01); *B32B 2262/106* (2013.01); *B32B 2305/076* (2013.01); *B32B 2305/08* (2013.01); *B32B 2305/188* (2013.01); *B32B 2305/72* (2013.01); *B32B 2605/18* (2013.01);
(Continued)

(58) Field of Classification Search
CPC .......................... Y10T 428/24174; B32B 5/28
USPC ......................................................... 428/119
See application file for complete search history.

(56) References Cited

U.S. PATENT DOCUMENTS 4,331,723 A 5/1982 Hamm
4,789,594 A 12/1988 Stawski
(Continued)

FOREIGN PATENT DOCUMENTS

DE 102007015518 A1 10/2008
EP 0396281 A2 11/1990
(Continued)

OTHER PUBLICATIONS

European Patent Office Extended European Search Report for Counterpart EP Application No. EP13190083, Applicant The Boeing Company, Date of Mailing Mar. 18, 2014, 7 pages.

*Primary Examiner* — Alexander Thomas

(57) ABSTRACT

There is provided in an embodiment a composite radius filler for a composite structure. The composite radius filler has two or more radius laminates. Each radius laminate has a laminate of stacked composite plies formed in a desired radius with a desired radial orientation of the stacked composite plies substantially matching a radial orientation of adjacent stacked composite plies of a composite structure surrounding the two or more radius laminates. Each radius laminate is preferably trimmed to have at least one side align adjacent to the others to form a composite radius filler having a shape substantially corresponding to a radius filler region of the composite structure.

20 Claims, 12 Drawing Sheets

(51) Int. Cl.
- *B29C 70/32* (2006.01)
- *B29C 70/54* (2006.01)
- *B32B 5/12* (2006.01)
- *B29D 99/00* (2010.01)
- *B64C 3/18* (2006.01)
- *B64C 3/26* (2006.01)
- *B32B 3/28* (2006.01)
- *B29L 31/30* (2006.01)
- *B29L 31/00* (2006.01)
- *B29C 65/48* (2006.01)
- *B29C 65/50* (2006.01)
- *B29C 65/00* (2006.01)

(52) U.S. Cl.
CPC ............ *Y02T 50/433* (2013.01); *Y10T 156/10* (2015.01); *Y10T 428/19* (2015.01)

(56) References Cited

U.S. PATENT DOCUMENTS

| | | |
|---|---|---|
| 5,639,535 A | 6/1997 | McCarville |
| 5,833,786 A | 11/1998 | McCarville et al. |
| 5,919,543 A | 7/1999 | McCarville et al. |
| 6,562,436 B2 | 5/2003 | George et al. |
| 6,689,448 B2 | 2/2004 | George et al. |
| 7,531,058 B2 | 5/2009 | Grose et al. |
| 7,823,490 B2 | 11/2010 | Evans et al. |
| 7,874,829 B2 | 1/2011 | Kirkendall |
| 8,084,114 B2 | 12/2011 | Grose et al. |
| 8,132,487 B2 | 3/2012 | Evans et al. |
| 2010/0140834 A1 | 6/2010 | Sherwood et al. |
| 2010/0252179 A1 | 10/2010 | Schoppmeier et al. |

FOREIGN PATENT DOCUMENTS

| | | |
|---|---|---|
| EP | 2336021 A2 | 6/2011 |
| WO | WO 01/62495 A2 | 8/2001 |

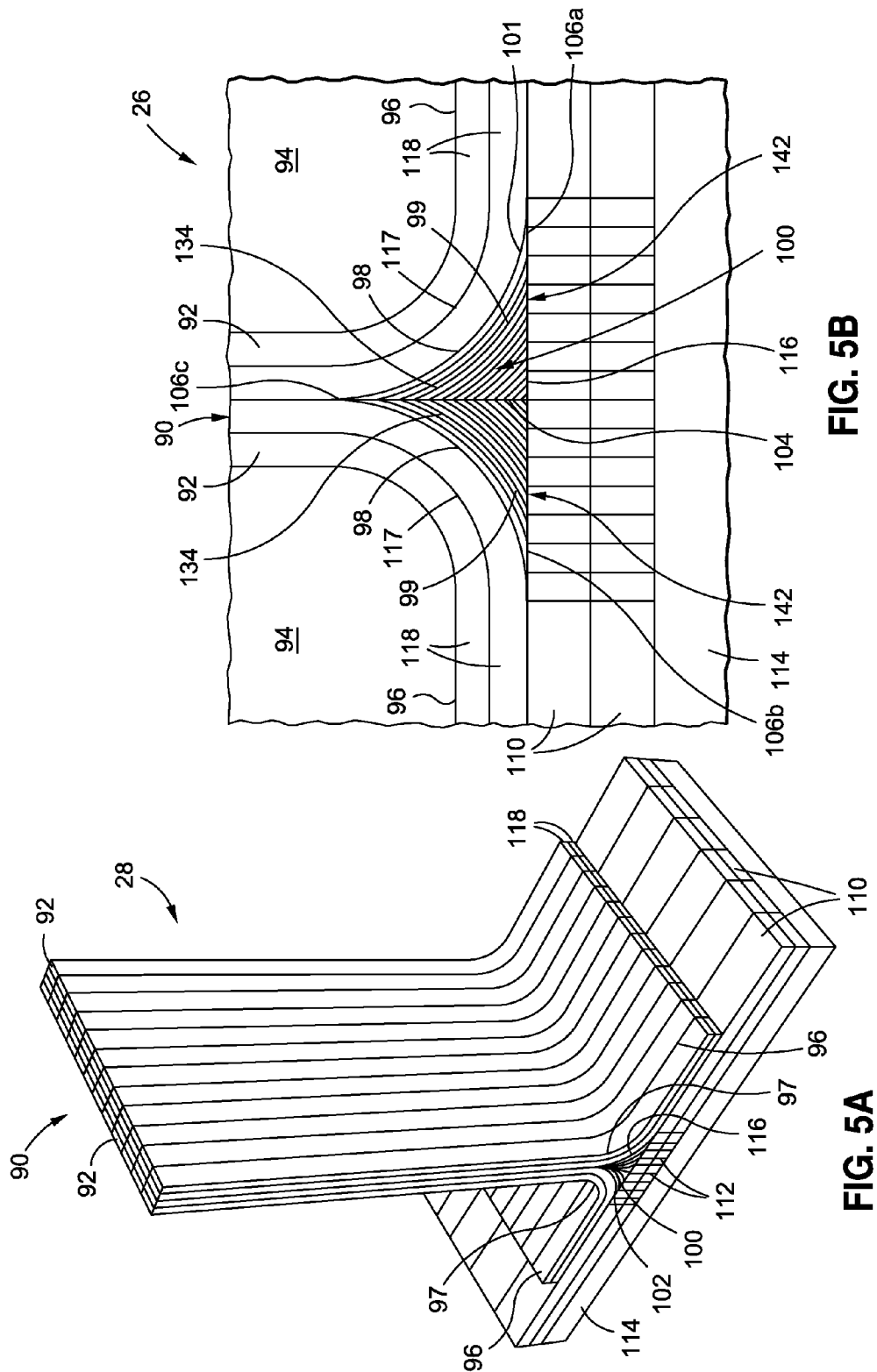

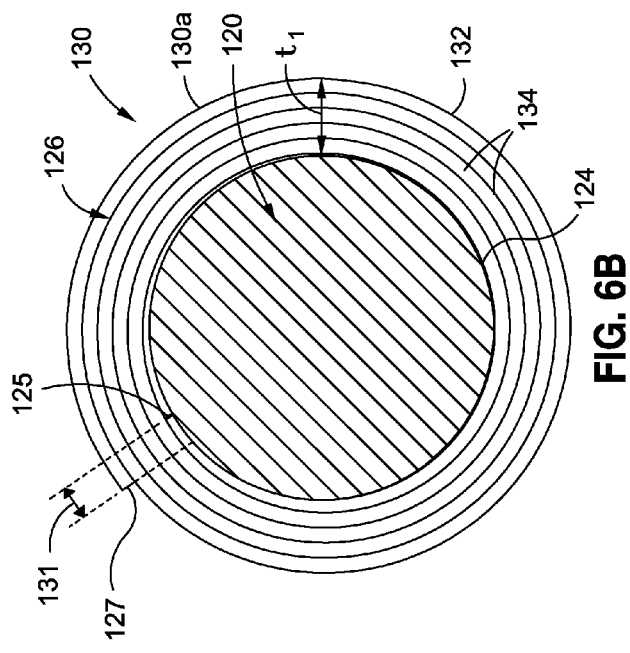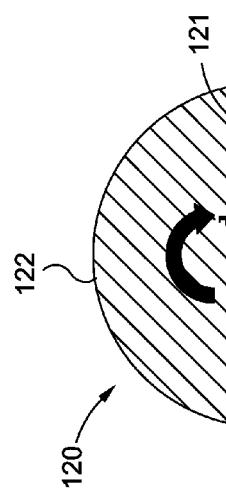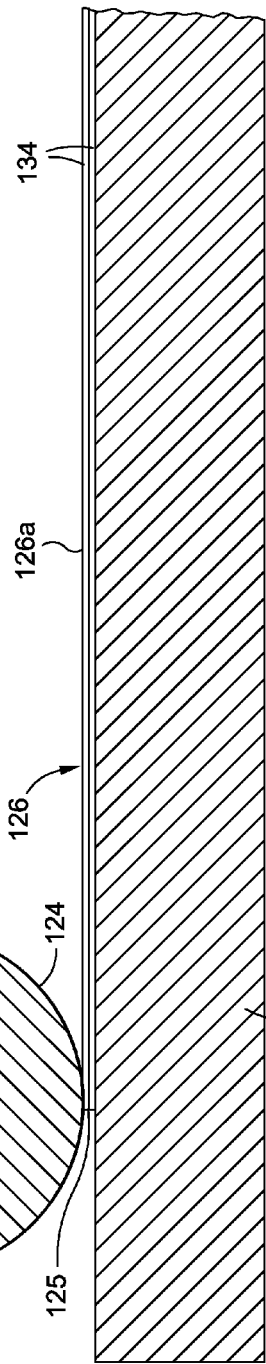

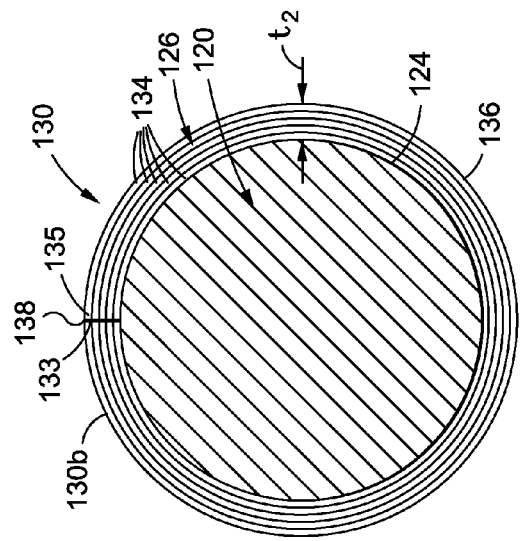
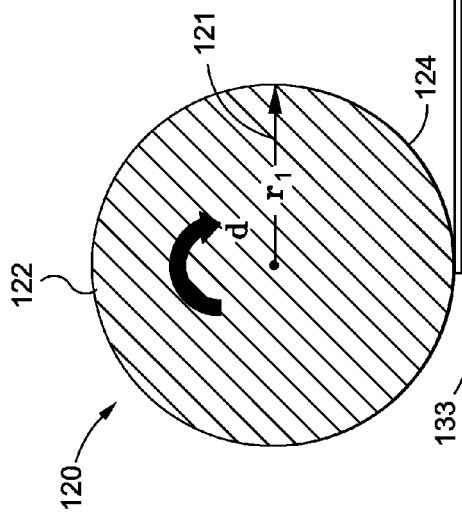
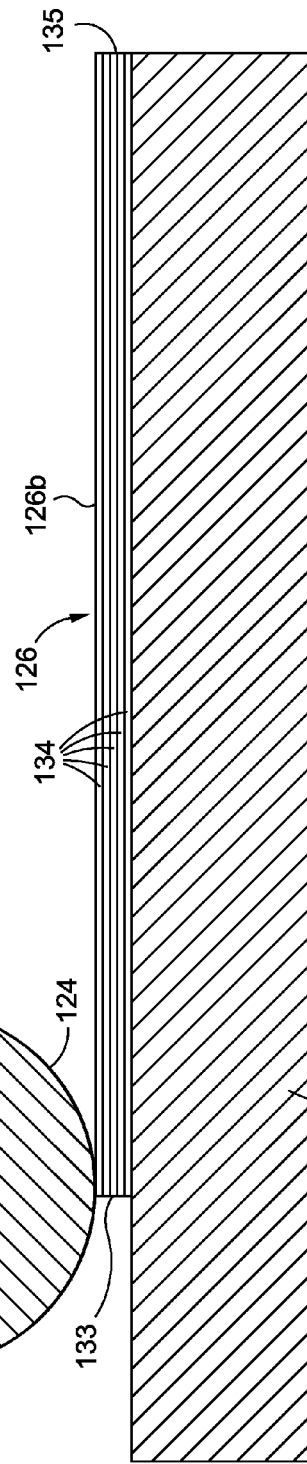
FIG. 7B
FIG. 7A

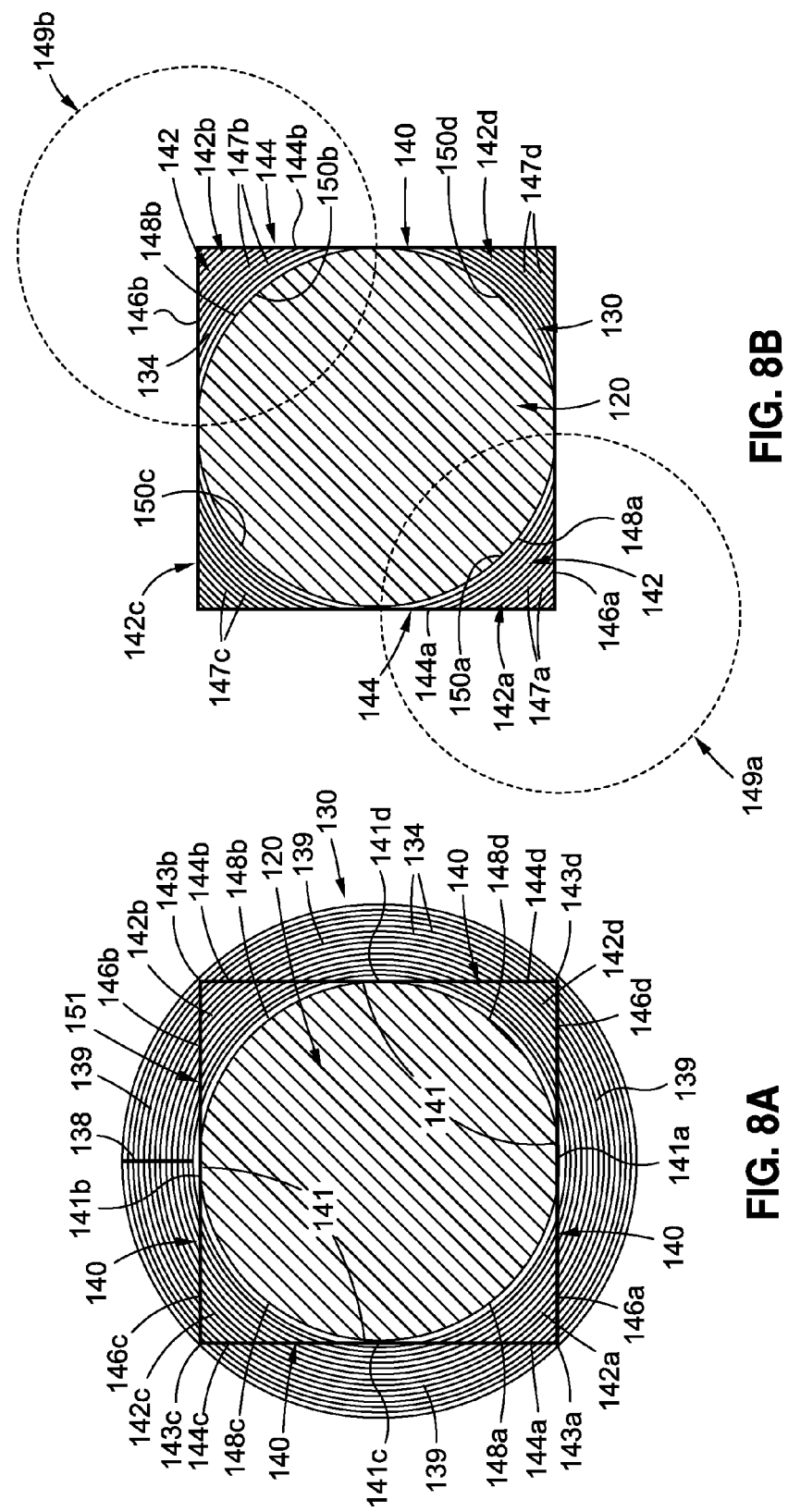

COMPOSITE RADIUS FILLERS AND METHODS OF FORMING THE SAME

BACKGROUND

1) Field of the Disclosure

The disclosure relates generally to composite structures, and more specifically, to composite radius fillers for use in composite structures, such as in aircraft, and methods for forming the same.

2) Description of Related Art

Composite structures, such as carbon fiber-reinforced plastic (CFRP) composite structures, are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft construction, composites structures are used in increasing quantities to form the fuselage, wings, tail sections, and other components.

For example, aircraft wings may be formed of composite stiffened panel structures comprising composite skin panels or webs to which reinforcing stiffeners or stringers may be attached or bonded to improve the strength, stiffness, buckling resistance, and stability of the composite skin panels or webs. The reinforcing stiffeners or stringers attached or bonded to the composite skin panels or webs may be configured to carry various loads and may be provided in a variety of different cross-sectional shapes, such as T-stiffeners, J-stiffeners, and I-beams. To assist the load carrying capability of the wing, a series of ribs may be connected to the stringers using shear ties. FIG. 4A is an illustration of a perspective view of a known shear tie and monolithic rib assembly 68 for an aircraft wing 18 (see FIG. 1). FIG. 4A shows monolithic ribs 70 with shear ties 72 interfacing with stringers 74 and skin panels 76. FIG. 4B is an illustration of a perspective view of a known shear tie and airload rib assembly 78 for an aircraft wing 18 (see FIG, 1). FIG. 4B shows shear ties 80 with ribs 82.

Gaps or void regions may be formed by the radius of each curved piece of the reinforcing stiffeners, such as T-stiffeners, J-stiffeners, and I-beams, when they are attached or joined perpendicularly to composite skin panels or webs. Such gaps or void regions may typically be referred to as "radius filler regions" or "noodle regions". Such radius filler regions or noodle regions within reinforcing stiffeners may be prone to cracking because they may be three-dimensionally constrained. Radius filler elements or "noodles" made of composite material or adhesive/epoxy material and having a generally triangular cross-section may be used to fill the radius filler regions or noodle regions in order to provide additional structural reinforcement to such regions.

Known configurations of radius filler elements or noodles exist. For example, such known configurations of radius filler elements or noodles may include CFRP radius filler elements or noodles that are extruded and bundle all zero degree plies with unidirectional fibers. However, such extruded all zero degree ply CFRP radius filler elements or noodles may have high through-thickness thermal expansion and resin shrinkage that may lead to high residual stresses, i.e., internal stresses created inside a component during manufacturing, such as thermal residual stress that may be created during heat curing. In addition, the unidirectional fibers of such extruded all zero degree ply CFRP radius filler elements or noodles may have low pull-off strength and may pull apart as a result of high residual stresses that may be created during heat curing at high temperatures, i.e., such as 350 degrees Fahrenheit or greater, and subsequent exposure to cold temperatures, i.e., such as less than −65 (minus sixty-five) degrees Fahrenheit, which may, in turn, lead to stress or fatigue cracking in the CFRP radius filler elements or noodles. To decrease the likelihood of such stress or fatigue cracking due to low pull-off strength and high pull-off loads, the use of shear ties on the wing ribs may be required. However, the use of such shear ties may add weight to the aircraft due to the possible need for a shear tie at each location where a rib intersects with a stringer. The added weight of the shear ties at each rib-stringer intersection may reduce the payload capacity of the aircraft and may increase fuel consumption and fuel costs. In addition, the addition of a shear tie at each rib-stringer intersection may increase manufacturing complexity, cost, and production time.

In addition, known laminated radius filler elements or noodles exist that have a generally triangular cross-section and that are constructed using a pyramid of plies in a single direction. However, such known laminated radius filler elements or noodles may minimize residual thermal stresses at only two points or peaks of the known laminated radius filler element or noodle but not at all three points or peaks of the known laminated radius filler element or noodle.

Accordingly, there is a need in the art for improved composite radius fillers and methods of forming the same that provide advantages over known elements, assemblies and methods.

SUMMARY

This need for improved composite radius fillers and methods of forming the same is satisfied. As discussed in the below detailed description, embodiments of improved composite radius fillers and methods of forming the same may provide significant advantages over known elements, assemblies and methods.

In one embodiment of the disclosure, there is provided a composite radius filler for a composite structure. The composite radius filler comprises two or more radius laminates. Each radius laminate comprises a laminate of stacked composite plies formed in a desired radius with a desired radial orientation of the stacked composite plies substantially matching a radial orientation of adjacent stacked composite plies of a composite structure surrounding the two or more radius laminates. Each radius laminate is preferably trimmed to have at least one side align adjacent to the others to form a composite radius filler having a shape substantially corresponding to a radius filler region of the composite structure.

In another embodiment of the disclosure, there is provided an aircraft composite assembly. The aircraft composite assembly comprises a composite structure having a radius filler region. The aircraft composite assembly further comprises a composite radius filler filling the radius filler region. The composite radius filler comprises two or more radius laminates. Each radius laminate comprises a laminate of stacked composite plies formed in a desired radius with a desired radial orientation of the stacked composite plies substantially matching a radial orientation of adjacent stacked composite plies of the composite structure surrounding the two or more radius laminates. Each radius laminate is preferably trimmed to have at least one side align adjacent to the others to form the composite radius filler having a shape substantially corresponding to the radius filler region of the composite structure.

In another embodiment of the disclosure, there is provided a method of forming a composite radius filler. The method comprises the step of wrapping a laminate of stacked composite plies one or more times about a forming tool having a desired radius to form a composite laminate layup of a desired thickness. The method further comprises the step of debulking the composite laminate layup to remove voids. The method further comprises the step of aligning all splices of the composite laminate layup at one or more desired portions to be removed from the composite laminate layup. The method further comprises the step of removing the one or more desired portions from the composite laminate layup in one or more cuts tangent to one or more surfaces of the forming tool. The method further comprises the step of removing from the forming tool two or more radius laminates of the composite laminate layup. The method further comprises the step of aligning the two or more radius laminates together to form a composite radius filler having a shape substantially corresponding to a radius filler region of a composite structure. Each radius laminate is formed in a desired radius with a desired radial orientation of stacked composite plies substantially matching a radial orientation of adjacent stacked composite plies of the composite structure surrounding the composite radius filler.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 5A is an illustration of a perspective view of a composite structure in the form of a T-stiffener having a radius filler region filled with an embodiment of a composite radius filler of the disclosure;

FIG. 5B is an illustration of an enlarged, fragmentary, front sectional view of a composite assembly incorporating the T-stiffener of FIG. 5A having the composite radius filler;

FIG. 6A is an illustration of a schematic representation of a front sectional view of exemplary embodiments of a forming tool and a laminate that may be used in one of the embodiments of a method of forming an embodiment of a composite radius filler of the disclosure;

FIG. 6B is an illustration of an enlarged, front sectional view of an exemplary embodiment of a composite laminate layup that may be used in one of the embodiments of a method of forming an embodiment of a composite radius filler of the disclosure;

FIG. 7A is an illustration of a schematic representation of a front sectional view of exemplary embodiments of a forming tool and a laminate that may be used in another one of the embodiments of a method of forming an embodiment of a composite radius filler of the disclosure;

FIG. 7B is an illustration of an enlarged, front sectional view of another exemplary embodiment of a composite laminate layup that may be used in one of the embodiments of a method of forming an embodiment of a composite radius filler of the disclosure;

FIG. 8A is an illustration of an enlarged, front sectional view of an exemplary embodiment of a composite laminate layup with cuts tangent to surfaces of the forming tool that may be used in one of the embodiments of a method of forming an embodiment of a composite radius filler of the disclosure;

FIG. 8B is an illustration of an enlarged, front sectional view of the composite laminate layup of FIG. 8A with portions removed leaving radius laminates to form composite radius fillers of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
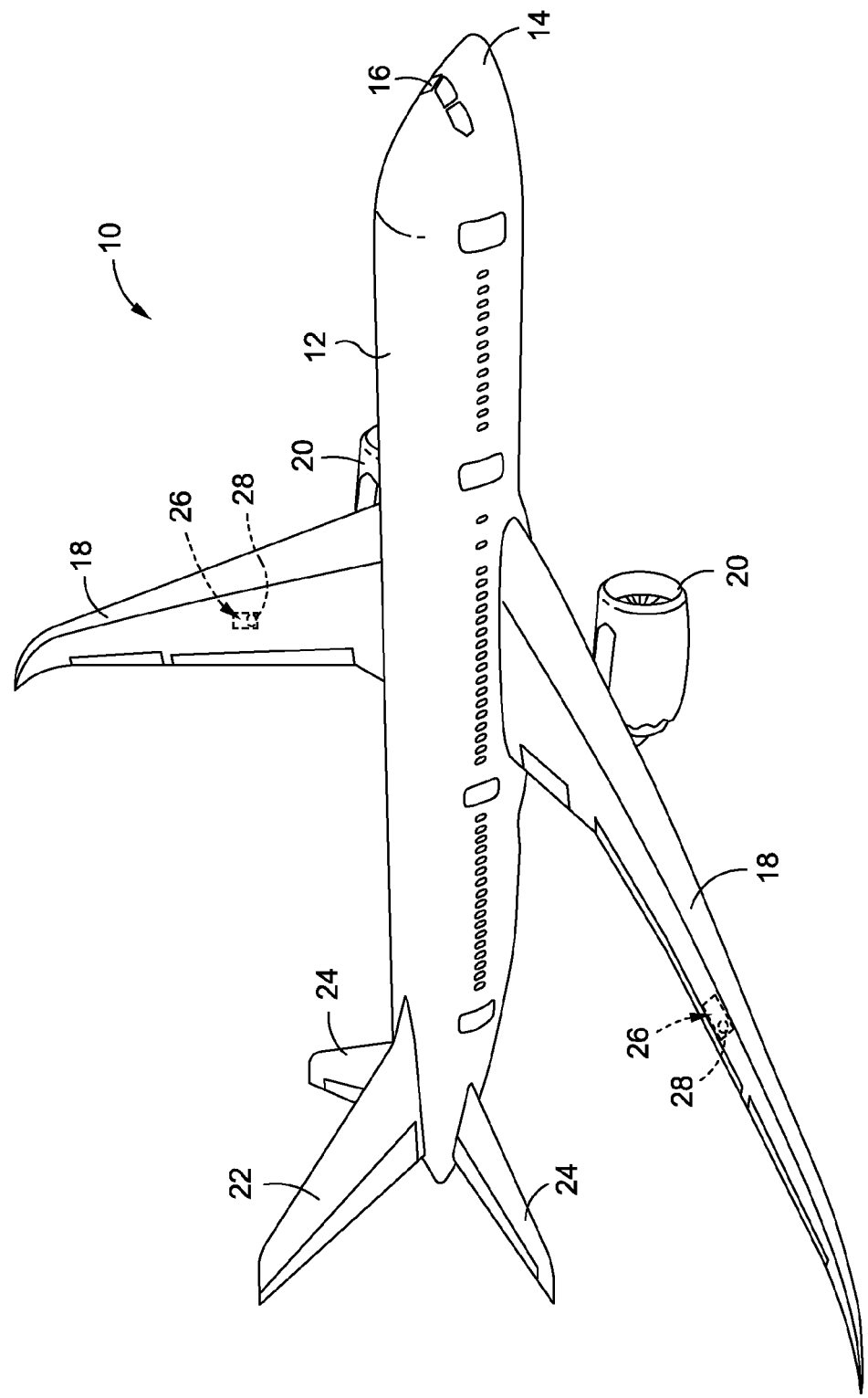
FIG. 1 is an illustration of a perspective view of an aircraft that may incorporate one or more composite assemblies having one or more composite structures with an embodiment of a composite radius filler of the disclosure.

Now referring to the Figures, FIG. 1 is an illustration of a perspective view of an aircraft 10 that may incorporate one or more composite assemblies 26 with one or more composite structures 28 having an embodiment of a composite radius filler 100 (see FIG. 5B), such as, for example, a composite radius filler 100a (see FIG. 8C), a composite radius filler 100b (see FIG. 8D), or a composite radius filler 100c (see FIG. 9), formed by one or more embodiments of a method 200 (see FIG. 10) of the disclosure. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more composite assemblies 26 with one or more composite structures 28, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more composite assemblies 26 with one or more composite structures 28 made with one or more embodiments of the method 200 (see FIG. 10) of the disclosure.

Figure 2:
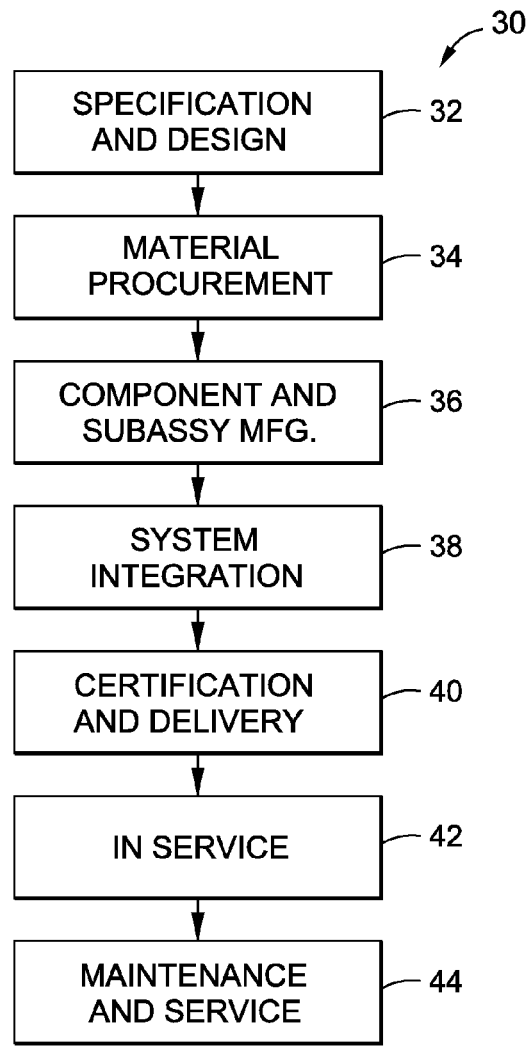
FIG. 2 is an illustration of a flow diagram of an aircraft production and service method.
Figure 3:
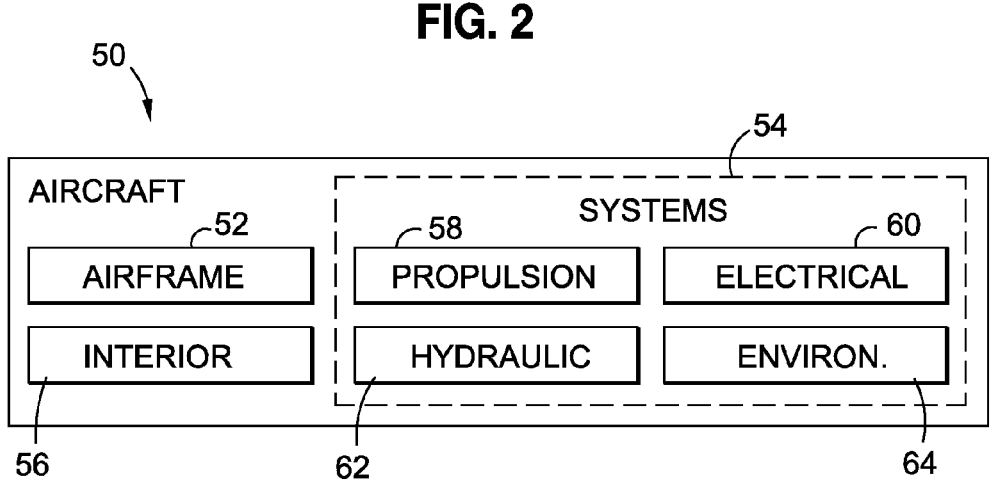
FIG. 3 is an illustration of a block diagram of an aircraft.

FIG. 2 is an illustration of a flow diagram of an aircraft production and service method 30. FIG. 3 is an illustration of a block diagram of an aircraft 50. Referring to FIGS. 2-3, embodiments of the disclosure may be described in the context of the aircraft manufacturing and service method 30 as shown in FIG. 2 and the aircraft 50 as shown in FIG. 3. During pre-production, exemplary method 30 may include specification and design 32 of the aircraft 50 and material procurement 34. During production, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 may be scheduled for routine maintenance and service 44 (which may also include modification, reconfiguration, refurbishment, and other suitable services).

Each of the processes of method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 50 produced by exemplary method 30 may include an airframe 52 with a plurality of systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Methods and systems embodied herein may be employed during any one or more of the stages of the production and service method 30. For example, components or subassemblies corresponding to component and subassembly manufacturing 36 may be fabricated or manufactured in a manner similar to components or subassemblies produced while the aircraft 50 is in service. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of apparatus embodiments, method embodiments, or a combination thereof, may be utilized while the aircraft 50 is in service, for example and without limitation, to maintenance and service 44.

In an embodiment of the disclosure, there is provided a composite radius filler 100 (see FIGS. 5A-5B), i.e., "noodle", for filling a radius filler region 116 (see FIGS. 5A-5B), i.e., "noodle region", in a composite structure 28 (see FIG. 5A). FIG. 5A is an illustration of a perspective view of a composite structure 28 in the form of a T-stiffener 90 having a radius filler region 116 filled with an embodiment of a composite radius filler 100 of the disclosure. FIG. 5B is an illustration of an enlarged, fragmentary, front sectional view of a composite assembly 26 incorporating the T-stiffener 90 of FIG. 5A having the composite radius filler 100.

As shown in FIG. 5A, the composite structure 28 in the form of T-stiffener 90 comprises vertical webs 92, horizontal flanges 96, and flange-web transitions 97 radially surrounding the composite radius filler 100. As further shown in FIG. 5A, the flanges 96 of the T-stiffener 90 may be joined to one or more base laminates 110 and/or skin panels 114 at an interface 102, for example, a skin-stiffener interface. The one or more base laminates 110 and/or skin panels 114 are preferably adjacent to and surround the base of the composite radius filler 100.

As shown in FIG. 5B, in one embodiment, a composite assembly 26 comprises the T-stiffener 90 with the vertical webs 92, the horizontal flanges 96, and the radius filler region 116 filled with composite radius filler 100. As further shown in FIG. 5B, the flanges 96 of the T-stiffener 90 may be joined to one or more base laminates 110 and/or skin panels 114. The composite assembly 26 further comprises spars 94 adjacent the T-stiffener 90.

As further shown in FIG. 5B, the composite radius filler 100 comprises two or more radius laminates 142. Each radius laminate 142 comprises a laminate 126 (see FIG. 6A) of stacked composite plies 134 (see FIGS. 5B, 6A). Preferably, the laminate 126 of stacked composite plies 134 has been debulked to compress or consolidate the stacked composite plies 134 in order to remove voids, such as air or other gases, that may be trapped between layers of the stacked composite plies 134. As further shown in FIG. 5B, each radius laminate 142 is preferably formed in a desired radius 98 with a desired radial orientation 99 of the stacked composite plies 134. The desired radial orientation 99 of the stacked composite plies 134 preferably substantially matches a radial orientation 117 (see FIG. 5B) of adjacent stacked composite plies 118 (see FIG. 5B) of the composite structure 28 (see FIG. 5A), such as the T-stiffener 90, surrounding the two or more radius laminates 142. Further, the desired radial orientation 99 of the stacked composite plies 134 preferably also substantially matches a radial orientation 112 (see FIG. 5A) of the composite structure 28 such as adjacent base laminates 110 and/or skin panels 114 surrounding the base of the two or more radius laminates 142. The way the stacked composite plies 134 curve around the desired radius 98 of each radius laminate 142 follows the same radial orientation 117 (see FIG. 5B) of the composite stacked plies 118 (see FIG. 5B) in the surrounding composite structure 28, such as the T-stiffener 90 (see FIG. 5B), so that the stacked composite plies 134 are like a continuation of the composite stacked plies 118.

The stacked composite plies 134 may preferably be formed from a reinforcement material surrounded by and supported within a matrix material, such as for example, a prepreg material. The reinforcement material may comprise high-strength fibers, such as glass or carbon fibers, graphite, aromatic polyamide fiber, fiberglass, or another suitable reinforcement material. The matrix material may comprise various polymer or resin materials, such as epoxy, polyester, vinyl ester resins, polyetheretherketone polymer (PEEK), polyetherketoneketone polymer (PEKK), bismaleimide, or another suitable matrix material. As used herein, "prepreg" means a woven or braided fabric or cloth-like tape material, e.g., fiberglass or carbon fibers, that have been impregnated with an uncured or partially cured resin, which is flexible enough to be formed into a desired shape, then "cured," e.g., by the application of heat in an oven or an autoclave, to harden the resin into a strong, rigid, fiber-reinforced structure. The stacked composite plies 134 may be in the form of a prepreg unidirectional tape, a unidirectional fiber tape, a carbon fiber-forced plastic (CFRP) tape, or another suitable tape; a carbon fiber-reinforced plastic (CFRP) fabric, a prepreg fabric, a woven fabric including a woven carbon fiber fabric, or another suitable fabric; a combination of a tape or a fabric thereof; or another suitable composite material. The composite radius filler 100 is preferably made of the same resin and fiber material used to form components in the composite assembly 26 (see FIG. 5B), such as the composite structure 28 (see FIG. 5A), the spars 94 (see FIG. 5B), the base laminates 110 (see FIG. 5B) and skin panels 114 (see FIG. 5B).

Figure 8C:
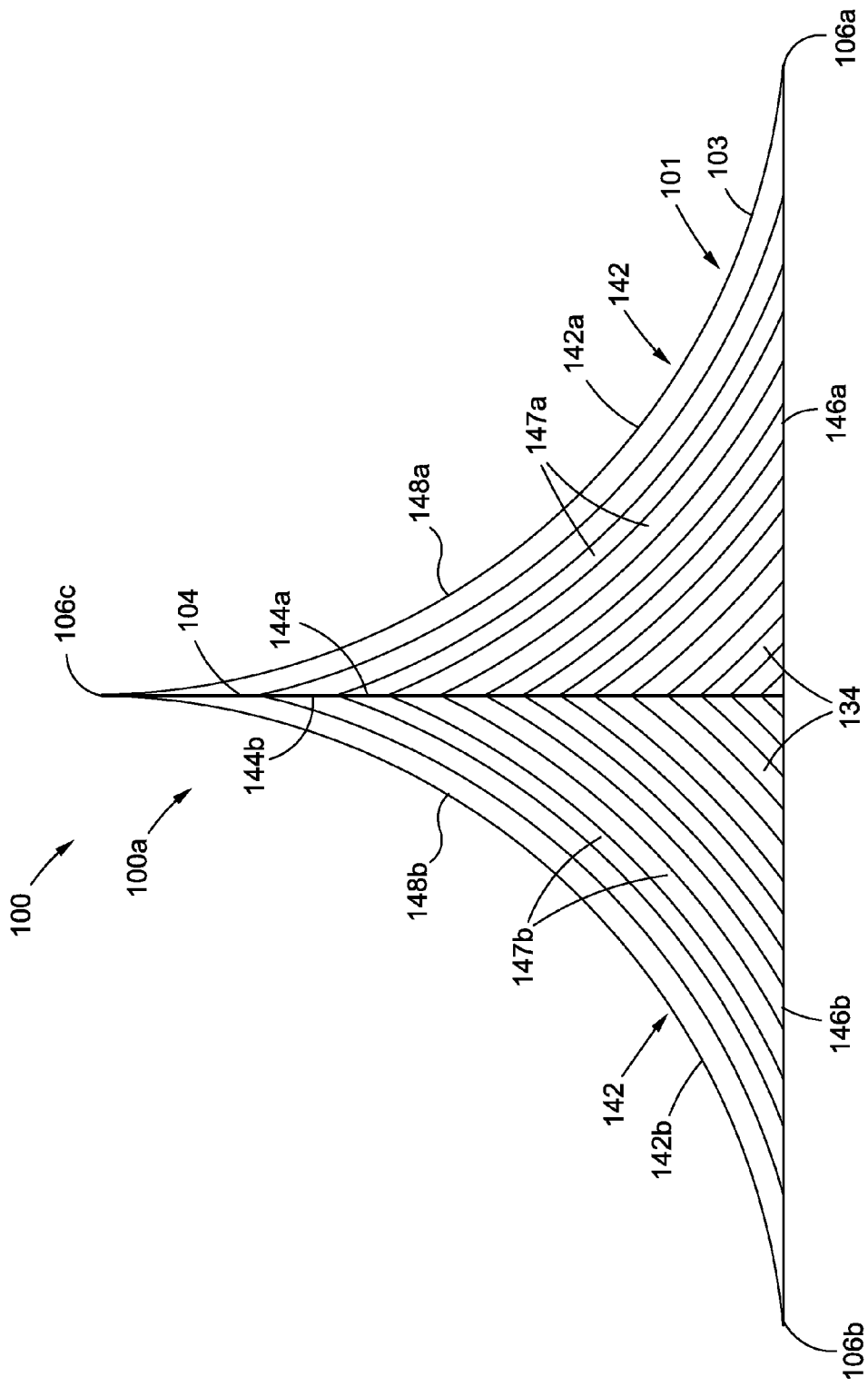
FIG. 8C is an illustration of an enlarged, front sectional view of one of the embodiments of a composite radius filler of the disclosure.

Each of the two or more radius laminates 142 (see FIG. 5B) are preferably obtained by removing them from a composite laminate layup 130 (see FIG. 8A) via cuts 140 (see FIG. 8A) made tangent to one or more surfaces 141 (see FIG. 8A) of a forming tool 120 (see FIG. 8A) wrapped with the composite laminate layup 130 (see FIG. 8A). Each radius laminate 142 may preferably have a generally triangular cross-section. Each radius laminate 142 is preferably trimmed to have at least one side 144 (see FIG. 8B) align adjacent to the others to form a composite radius filler 100 (see FIG. 5B) having a shape substantially corresponding to the radius filler region of the composite structure 28 (see FIG. 5A). In particular, each radius laminate 142 is preferably trimmed to have at least one side 144 (see FIG. 8B) align adjacent to at least one side 144 (see FIG. 8B) of another radius laminate 142 in order to form a vertical joint 104 (see FIG. 5B), and in turn, to form a composite radius filler 100 (see FIG. 5B). The composite radius filler 100 preferably has a shape 101 (see FIG. 5B) or geometry substantially corresponding to the shape or geometry of the radius filler region 116 (see FIGS. 5A-5B) of the composite structure 28 (see FIG. 5A). The composite radius filler 100 is formed in order to fill the volume of and assume the shape and geometry of the radius filler region 116 to be filled. The shape 101 (see FIGS. 5B, 8C, 8D) of the composite radius filler 100 (see FIG. 5B) may preferably comprise a substantially pyramid shaped configuration 103 (see FIGS. 5B, 8C, 8D). The composite radius filler 100 may preferably have a generally triangular cross-section.

As shown in FIG. 5B, the individual stacked composite plies 134 of composite radius filler 100 preferably form corner points at three stress concentration points 106a, 106b, 106c of the composite radius filler 100. Preferably, the desired radial orientation 99 (see FIG. 5B) of the stacked composite plies 134 is selected to substantially match the coefficient of thermal expansion (CTE) of the composite radius filler 100 (see FIG. 5B), and in particular, is selected to substantially match the CTE at each of the three stress concentration points 106a, 106b, 106c (see FIG. 5B) of the composite radius filler 100 to the CTE or CTEs of the respective adjacent stacked composite plies 118 (see FIG. 5B) of the composite structure 28 (see FIG. 5A), such as the T-stiffener 90, surrounding the composite radius filler 100, to minimize or reduce cracking of the composite radius filler 100 from residual thermal stresses, especially that may occur during heat cure of the composite radius filler 100 and the composite structure 28. Preferably, the composite radius filler 100 minimizes residual thermal stresses at the three stress concentration points 106a, 106b, 106c (see FIGS. 5B) of the composite radius filler 100 during heat cure of the composite radius filler 100 and the composite structure 28. CTE matching preferably minimizes or reduces the possibility of the composite radius filler 100 cracking from residual thermal stresses. Embodiments of the composite radius filler 100 preferably move the high residual thermal stresses away from the three stress concentration points 106a, 106b, 106c of the composite radius filler 100, thus minimizing cracks and crack formation. In addition, embodiments of the composite radius filler 100 preferably increase a pull-off load and enhance a pull-off strength. As used herein, "pull-off load" means a shear load and/or moment force applied to a composite structure, such as a reinforcing stiffener, at locations where the composite structure is attached or bonded to another composite structure, such as a composite skin panel or web, such that the shear load and/or moment force may cause delamination or separation of the reinforcing stiffener from the attached composite structure.

Figure 10:
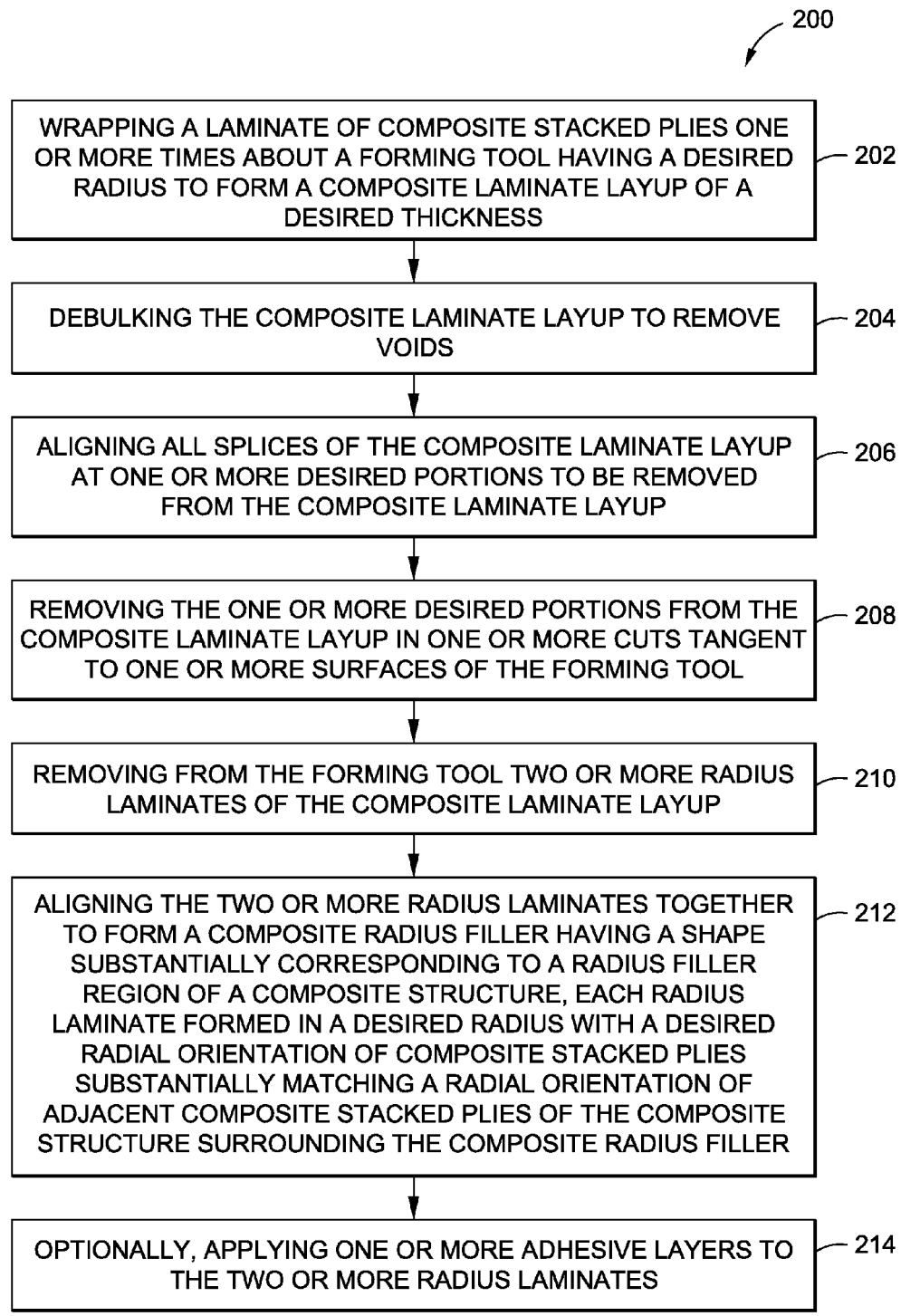

In another embodiment of the disclosure, there is provided a method 200 of forming a composite radius filler 100 (see FIG. 5B). Preferably, the composite radius filler 100 is used for filling a radius filler region 116 (see FIG. 5B) in a composite structure 28 (see FIGS. 1, 5A). FIG. 10 is an illustration of a flow diagram of an exemplary embodiment of the method 200 of the disclosure. As shown in FIG. 10, the method 200 comprises step 202 of wrapping or laying up a laminate 126 (see FIG. 6A) of stacked composite plies 134 (see FIG. 6A) one or more times about a forming tool 120 (see FIG. 6A) having a desired radius 121 ($r_1$) (see FIG. 6A) in order to form a composite laminate layup 130 (see FIG. 6B) of a desired thickness ($t_1$) (see FIG. 6B). One exemplary embodiment of the wrapping step 202 is shown in FIGS. 6A-6B. Another exemplary embodiment of the wrapping step is shown in FIGS. 7A-7B. However, such exemplary embodiments are not intended to be limited to the embodiments set forth herein, and other suitable wrapping or laying up processes may also be used in the method 200.

FIG. 6A is an illustration of a schematic representation of a front sectional view of exemplary embodiments of a forming tool 120 and a laminate 126, such as in the form of laminate 126a, that may be used in one of the embodiments of the method 200 of forming an embodiment of a composite radius filler 100 of the disclosure. As shown in FIG. 6A, the forming tool 120 may be in the form of a cylindrical mandrel 122 that may be elongated. However, forming tools 120 of other suitable shapes and configurations may also be used. The forming tool 120 (see FIG. 6A) may have a desired radius 121 ($r_1$) (see FIG. 6A). Preferably, the length of the desired radius 121 ($r_1$) may be in a range of from about 0.25 inch to about 1.0 inch. However, other suitable lengths of the desired radius 121 ($r_1$) may also be used.

As shown in FIG. 6A, an outer surface 124 of the forming tool 120 may be positioned over a first end 125 of the laminate 126, such as in the form of laminate 126a, having stacked composite plies 134. The laminate 126 may be positioned on a forming platform 128 (see FIG. 6A) or another suitable surface for the wrapping step 202. In the embodiment shown in FIGS. 6A-6B, the forming tool 120 is preferably rolled in the direction indicated by direction arrow (d) (see FIG. 6A), and the wrapping step 202 may comprise continuously wrapping the laminate 126 of stacked composite plies 134 multiple times about the forming tool 120 to form the composite laminate layup 130 (see FIG. 6B) of the desired thickness ($t_1$) (see FIG. 6B). The wrapping step 202 or laying up of the composite laminate layup 130, such as in the form of composite laminate layup 130a (see FIG. 6B), on the forming tool 120 may be conducted via a manual process or via an automated process with a known layup apparatus or machine.

FIG. 6B is an illustration of an enlarged, front sectional view of an exemplary embodiment of the composite laminate layup 130, such as in the form of composite laminate layup 130a, that may be used in one of the embodiments of the method 200 of forming an embodiment of the composite radius filler 100 of the disclosure. As shown in FIG. 6B, the laminate 126 of stacked composite plies 134 may be continuously wrapped multiple times around the forming tool 120 starting at the first end 125 and ending at a second end 127. As shown in FIG. 6B, a lap splice 131 may be formed between the first end 125 and the second end 127 to bond or secure the second end 127 to the first end 125 or to bond or secure the second end 127 to the composite laminate layup 130. Alternatively, another type of splice, joint, bond, or securement means may be used to bond or secure the second end 127 to the composite laminate layup 130. As further shown in FIG. 6B, the composite laminate layup 130 that is formed preferably has a desired thickness ($t_1$) that may be measured at a distance between the outer surface 124 of the forming tool 120 and an outer surface 132 of the composite laminate layup 130.

FIG. 7A is an illustration of a schematic representation of a front sectional view of exemplary embodiments of the forming tool 120 and the laminate 126, such as in the form of laminate 126b, that may be used in one of the embodiments of the method 200 of forming an embodiment of the composite radius filler 100 of the disclosure. As shown in FIG. 7A, the forming tool 120 is in the form of a cylindrical mandrel 122 that may be elongated. However, forming tools 120 of other suitable shapes and configurations may also be used. The forming tool 120 (see FIG. 7A) may have a desired radius 121 ($r_1$) (see FIG. 7A). Preferably, the length of the desired radius 121 ($r_1$) may be in a range of from about 0.25 inch to about 1.0 inch. However, other suitable lengths of the desired radius 121 ($r_1$) may also be used.

As shown in FIG. 7A, an outer surface 124 of the forming tool 120 may be positioned over a first end 133 of the laminate 126, such as in the form of laminate 126b, having stacked composite plies 134. The laminate 126 may be positioned on a forming platform 128 (see FIG. 7A) or another suitable surface for the wrapping step 202. In the embodiment shown in FIGS. 7A-7B, the forming tool 120 is preferably rolled in the direction indicated by direction arrow (d) (see FIG. 7A), and the wrapping step 202 may comprise wrapping the laminate 126 of stacked composite plies 134 one time about the forming tool 120 and either butt splicing, lap splicing, or otherwise splicing, joining, or bonding the laminate 126 of stacked composite plies 134 together to form the composite laminate layup 130 (see FIG. 7B), such as in the form of composite laminate layup 130b (see FIG. 7B), of a desired thickness ($t_2$) (see FIG. 7B). The wrapping step 202 or laying up of the composite laminate layup 130, such as in the form of composite laminate layup 130b, on the forming tool 120 may be conducted via a manual process or via an automated process with a known layup apparatus or machine.

FIG. 7B is an illustration of an enlarged, front sectional view of another exemplary embodiment of the composite laminate layup 130, such as in the form of composite laminate layup 130b, that may be used in one of the embodiments of the method 200 of forming an embodiment of the composite radius filler 100 of the disclosure. As shown in FIG. 7B, the laminate 126 of stacked composite plies 134 is preferably wrapped one time around the forming tool 120 starting at the first end 133 and ending at a second end 135. As shown in FIG. 7B, a butt splice 138 may be formed between the first end 133 and the second end 135 to bond or secure the first end 133 to the second end 135 of the composite laminate layup 130. Alternatively, a lap splice 131 (see FIG. 6B) or another type of splice, joint, bond, or securement means may be used to bond or secure the first end 133 to the second end 135. As further shown in FIG. 7B, the composite laminate layup 130 that is formed preferably has a desired thickness ($t_2$) that may be measured at a distance between the outer surface 124 of the forming tool 120 and an outer surface 136 of the composite laminate layup 130.

As shown in FIG. 10, the method 200 further comprises the step 204 of debulking the composite laminate layup 130 to remove voids. The debulking step 204 comprises compressing or consolidating the composite laminate layup 130 in order to remove voids, such as formed by air or other gases that may be trapped between layers of the stacked composite plies 134. Debulking preferably increases the density of the composite laminate layup 130. The debulking step 204 may be accomplished via known processes such as vacuum bagging the composite laminate layup 130 on the forming tool 120 under sufficient heat and/or pressure, and/or exposing the composite laminate layup 130 to sufficient heat and/or pressure in an autoclave or other suitable heating vessel and/or pressure vessel for a sufficient length of time to effectively debulk the composite laminate layup 130.

The method 200 may further comprise after the debulking step 204, repeating each of the wrapping step 202 and the debulking step 204 one or more additional times as necessary to obtain the composite laminate layup 130 of the desired thickness.

As shown in FIG. 10, the method 200 further comprises the step 206 of aligning all splices or joints or bonds, for example, lap splice 131 (see FIG. 6B) and/or butt splice 138 (see FIG. 7B), or another suitable splice, joint, or bond, of the composite laminate layup 130 at one or more desired portions 139 (see FIG. 8A) to be removed from the composite laminate layup 130 (see FIG. 8A). The aligning step 206 may comprise aligning the splices, for example, lap splice 131 (see FIG. 6B) and/or butt splice 138 (see FIGS. 7B, 8A), of the composite laminate layup 130 (see FIG. 8A) at the one or more desired portions 139 (see FIG. 8A) to be removed, such as at one or more of a 12 o'clock position 141b (see FIG. 8A), a 3 o'clock position 141d (see FIG. 8A), a 6 o'clock position 141a (see FIG. 8A), and/or a 9 o'clock position 141c (see FIG. 8A) on the composite laminate layup 130 at the interface between the forming tool 120 and the composite laminate layup 130.

As shown in FIG. 10, the method 200 further comprises step 208 of removing the one or more desired portions 139 (see FIG. 8A) from the composite laminate layup 130 (see FIG. 8A) in one or more cuts 140 (see FIG. 8A) tangent to one or more surfaces 141 (see FIG. 8A) of the forming tool 120 (see FIG. 8A). The removing step 208 may preferably comprise making cuts 140, such as four orthogonal cuts, for example, from corner 143a (see FIG. 8A) to corner 143d (see FIG. 8A), from corner 143d to corner 143b (see FIG. 8A), from corner 143b to corner 143c (see FIG. 8A), and from corner 143c to corner 143a, in order to form a substantially square configuration 151 (see FIG. 8A) about the forming tool 120 (see FIG. 8A). FIG. 8A is an illustration of an enlarged, front sectional view of an exemplary embodiment of the composite laminate layup 130 with cuts 140 tangent to surfaces 141 of the forming tool 120 that may be used in one of the embodiments of the method 200 of forming an embodiment of the composite radius filler 100 of the disclosure.

The one or more desired portions 139 (see FIG. 8A) from the composite laminate layup 130 (see FIG. 8A) may be removed in one or more cuts 140 (see FIG. 8A) tangent to one or more surfaces 141 (see FIG. 8A) of the forming tool 120 by cutting the composite laminate layup 130 with a known cutting device using a known cutting process, such as an ultrasonic cutting device and ultrasonic cutting process, a fabric cutting device and fabric cutting process, a laser cutting device and laser cutting process, or another suitable cutting device and cutting process.

As shown in FIG. 10, the method 200 further comprises the step 210 of removing from the forming tool 120 two or more radius laminates 142 (see FIG. 8B) of the composite laminate layup 130 (see FIG. 8B). FIG. 8B is an illustration of an enlarged, front sectional view of the composite laminate layup 130 of FIG. 8A with portions 139 (see FIG. 8A) removed, leaving radius laminates 142, such as in the form of a first pair of radius laminates 142 comprising first radius laminate 142a and second radius laminate 142b, and such as in the form of a second pair of radius laminates 142 comprising first radius laminate 142c and second radius laminate 142d, to be used in forming composite radius fillers 100 of the disclosure. As shown in FIG. 8B, the radius laminates 142 each have a generally triangular cross section.

A first composite radius filler 100 (see FIG. 8C) may be formed from the first pair of radius laminates 142, such as first radius laminate 142a (see FIGS. 8B, 8C) and second radius laminate 142b (see FIGS. 8B, 8C). Circle 149a (see FIG. 8B) shows the first radius laminate 142a portion that may be removed from the forming tool 120 via a tangential cut 150a (see FIG. 8B). Circle 149b (see FIG. 8B) shows the second radius laminate 142b portion that may be removed from the forming tool 120 via a tangential cut 150b (see FIG. 8B). A second composite radius filler 100 similar to the composite radius filler 100 shown in FIG. 8C may be formed from the second set of radius laminates 142, such as first radius laminate 142c (see FIG. 8B) and second radius laminate 142d (see FIG. 8B). The first radius laminate 142c portion (see FIG. 8B) may be removed from the forming tool 120 via a tangential cut 150c (see FIG. 8B), and the second radius laminate 142d portion (see FIG. 8B) may be removed from the forming tool 120 via a tangential cut 150d (see FIG. 8B). The radius laminates 142, such as first radius laminate 142a, second radius laminate 142b, first radius laminate 142c, and second radius laminate 142d may be removed with the tangential cuts 150a, 150b, 150c, 150d, respectively, by cutting the radius laminates 142 away from the forming tool 120 with a known cutting device and known cutting process, such as an ultrasonic cutting device and ultrasonic cutting process, a fabric cutting device and fabric cutting process, a laser cutting device and laser cutting process, or another suitable cutting device and cutting process.

As shown in FIGS. 8A-8B, the first radius laminate 142a comprises a first side 144a, a second side 146a orthogonal to the first side 144a, a third radial side 148a adjacent the forming tool 120, and stacked composite plies 134 comprising radially oriented stacked composite plies 147a (see FIG. 8B). As shown in FIGS. 8A-8B, the second radius laminate 142b comprises a first side 144b, a second side 146b orthogonal to the first side 144b, a third radial side 148b adjacent the forming tool 120, and stacked composite plies 134 comprising radially oriented stacked composite plies 147b (see FIG. 8B). As shown in FIG. 8A, the first radius laminate 142c comprises a first side 144c, a second side 146c orthogonal to the first side 144c, a third radial side 148c adjacent the forming tool 120, and stacked composite plies 134 comprising radially oriented stacked composite plies 147c (see FIG. 8B). As shown in FIG. 8A, the second radius laminate 142d comprises a first side 144d, a second side 146d orthogonal to the first side 144d, a third radial side 148d adjacent the forming tool 120, and stacked composite plies 134 comprising radially oriented stacked composite plies 147d (see FIG. 8B).

Figure 8D:
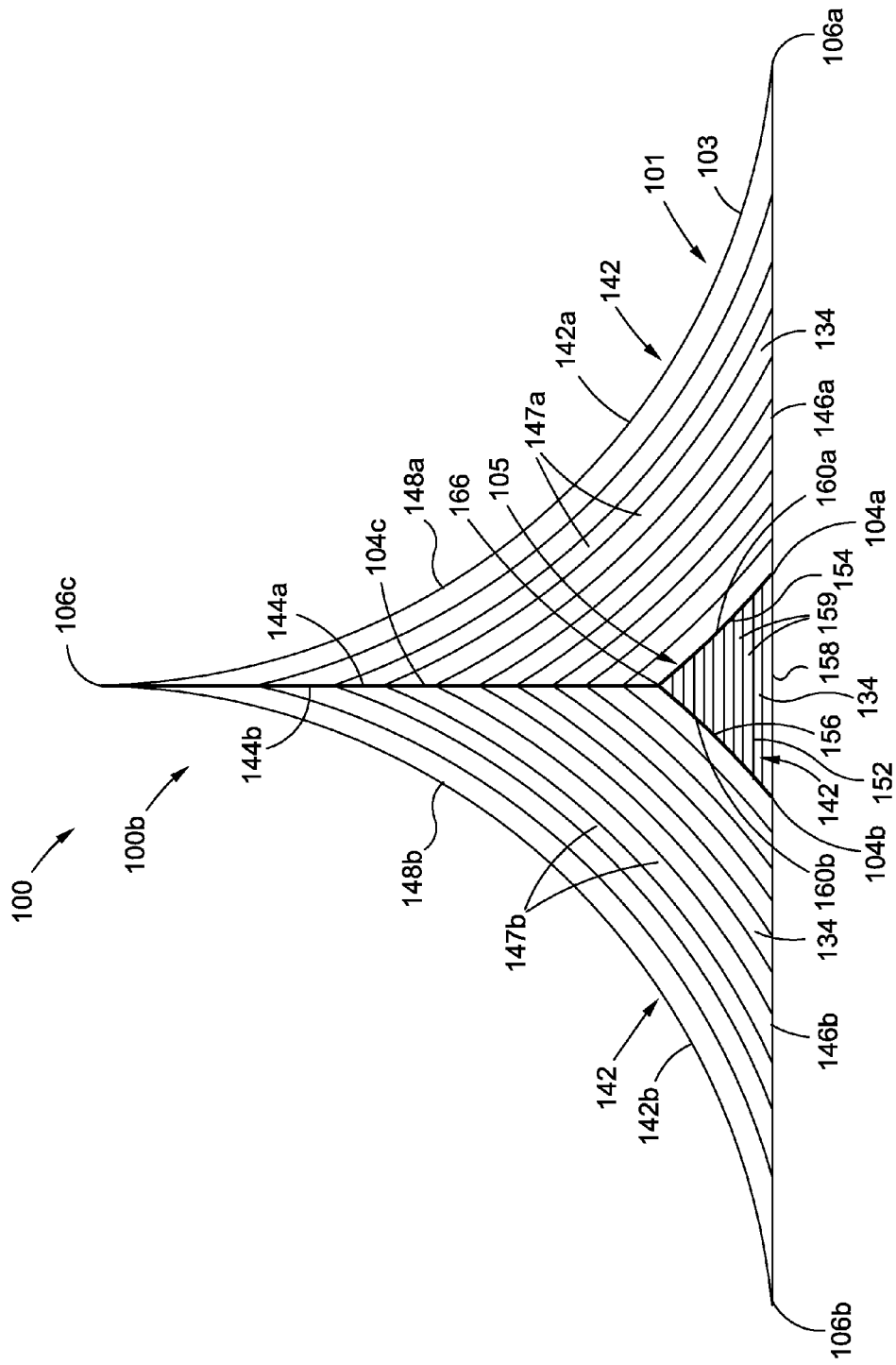
FIG. 8D is an illustration of an enlarged, front sectional view of another one of the embodiments of a composite radius filler of the disclosure.

As shown in FIG. 10, the method 200 further comprises the step 212 of aligning the two or more radius laminates 142 together to form a composite radius filler 100 having a shape substantially corresponding to a radius filler region 116 (see FIG. 5A) of a composite structure 28 (see FIG. 5A). As shown in FIG. 5B, each radius laminate 142 is preferably formed in a desired radius 98 with a desired radial orientation 99 of stacked composite plies 134 substantially matching a radial orientation 117 of adjacent stacked composite plies 118 of the composite structure 28 surrounding the composite radius filler 100. In one embodiment, the aligning step 212 may comprise aligning a first radius laminate 142a (see FIG. 8C) with a second radius laminate 142b (see FIG. 8C) to form the composite radius filler 100 (see FIG. 8C), such as in the form of composite radius filler 100a, having a shape 101 (see FIG. 8C) comprising a substantially pyramid shaped configuration 103 (see FIG. 8C). In another embodiment, the aligning step 212 may comprise aligning a first radius laminate 142a (see FIG. 8D), a second radius laminate 142b (see FIG. 8D), and a third radius laminate 152 (see FIG. 8D) to form the composite radius filler 100 (see FIG. 8D), such as in the form of composite radius filler 100b, having a shape 101 (see FIG. 8D) comprising a substantially pyramid shaped configuration 103 (see FIG. 8D). As shown in FIG. 8D, the third radius laminate 152 is preferably positioned at a portion 166 between the first radius laminate 142a and the second radius laminate 142b.

FIG. 8C is an illustration of an enlarged, front sectional view of one of the embodiments of the composite radius filler 100, such as in the form of composite radius filler 100a, of the disclosure. In this embodiment of the composite radius filler 100, as shown in FIG. 8C, the two or more radius laminates 142 may comprise the first radius laminate 142a aligned adjacent to the second radius laminate 142b to form a vertical joint 104, and in turn, to form the composite radius filler 100. The composite radius filler 100 preferably has a shape 101 (see FIG. 8C) substantially corresponding to a radius filler region 116 (see FIG. 5A) of a composite structure 28 (see FIG. 5A). The shape 101 may preferably comprise a substantially pyramid shaped configuration 103 (see FIG. 8C). The composite radius filler 100, such as in the form of composite radius filler 100a, may preferably have a generally triangular cross-section.

As shown in FIG. 8C, the first side 144a of the first radius laminate 142a may be aligned with the first side 144b of the second radius laminate 142b to form the vertical joint 104. The second side 146a of the first radius laminate 142a and second side 146b of the second radius laminate 142b may be aligned in a substantially straight line to form the base of the composite radius filler 100. The third radial side 148a of the first radius laminate 142a is preferably positioned outward and is preferably adjacent to and corresponds to the surrounding composite structure 28 (see FIG. 5A), such as the T-stiffener 90 (see FIG. 5B). The third radial side 148b of the second radius laminate 142b is also preferably positioned outward and is also preferably adjacent to and corresponds to the surrounding composite structure 28 (see FIG. 5A), such as the T-stiffener 90 (see FIG. 5B). As shown in FIG. 8C, the third radial side 148a is preferably positioned opposite the third radial side 148b.

Similar to the first radius laminate 142a and second radius laminate 142b that may be combined to form composite radius filler 100, such as in the form of composite radius filler 100a, the first radius laminate 142c (see FIG. 8B) and the second radius laminate 142d (see FIG. 8B) may also be combined to form a composite radius filler 100, such as in the form of composite radius filler 100a. The first radius laminate 142c (see FIG. 8B) and the second radius laminate 142d (see FIG. 8B) may be aligned adjacent to each other in a similar manner and configuration as the first radius laminate 142a and the second radius laminate 142b in FIG. 8C in order to form another composite radius filler 100.

FIG. 8D is an illustration of an enlarged, front sectional view of another one of the embodiments of the composite radius filler 100, such as in the form of composite radius filler 100b, of the disclosure. In this embodiment, as shown in FIG. 8D, a tri-laminate composite radius filler comprises three radius laminates 142. As shown in FIG. 8D, the three radius laminates 142 may comprise a first radius laminate 142a, a second radius laminate 142b (or alternatively, a first radius laminate 142c (see FIG. 8B) and a second radius laminate 142d (see FIG. 8B)), and a third radius laminate 152 (see FIG. 8D). As shown in FIG. 8D, the third radius laminate 152 comprises a first side 154, a second side 156, and a base 158. The third radius laminate 152 is preferably of a sufficient shape and size to be able to fit between and adjacent to the first radius laminate 142a and the second radius laminate 142b, respectively (or alternatively, to fit between and adjacent to the first radius laminate 142c (see FIG. 8B) and the second radius laminate 142d (see FIG. 8B), respectively). As shown in FIG. 8D, the third radius laminate 152 may be in the form of a substantially pyramid shaped configuration 105. The third radius laminate 152 further comprises stacked composite plies 134 having a desired radial orientation 159 that substantially matches a radial orientation of adjacent base laminates 110 (see FIG. 5A), skin panels 114 (see FIG. 5A), or a composite web 108 (see FIG. 9).

As shown in FIG. 8D, the first radius laminate 142a, the second radius laminate 142b, and the third radius laminate 152 are all aligned adjacent to each other to form a composite radius filler 100, such as in the form of composite radius filler 100b. As shown in FIG. 8D, the first radius laminate 142a may be substantially aligned adjacent to the second radius laminate 142b to form a vertical joint 104c. As further shown in FIG. 8D, a portion 160a of the first radius laminate 142a may also be aligned adjacent to the first side 154 of the third radius laminate 152 to form a joint 104a. As further shown in FIG. 8D, a portion 160b of the second radius laminate 142b may be aligned adjacent to the second side 156 of the third radius laminate 152 to form a joint 104b. As further shown in FIG. 8D, the third radius laminate 152 may preferably be positioned at an area 166 (see FIG. 8D) between the first radius laminate 142a and the second radius laminate 142b, respectively (or alternatively, between first radius laminate 142c (see FIG. 8B) and second radius laminate 142d (see FIG. 8B), respectively). Joint 104a and joint 104b may join to vertical joint 104c at area 166. The composite radius filler 100 preferably has a shape 101 (see FIG. 8D) substantially corresponding to a radius filler region 116 (see FIG. 5B) of the composite structure 28 (see FIG. 5A). The shape 101 may preferably comprise a substantially pyramid shaped configuration 103 (see FIG. 8D). The composite radius filler 100, such as in the form of composite radius filler 100b, may preferably have a generally triangular cross-section.

Figure 9:
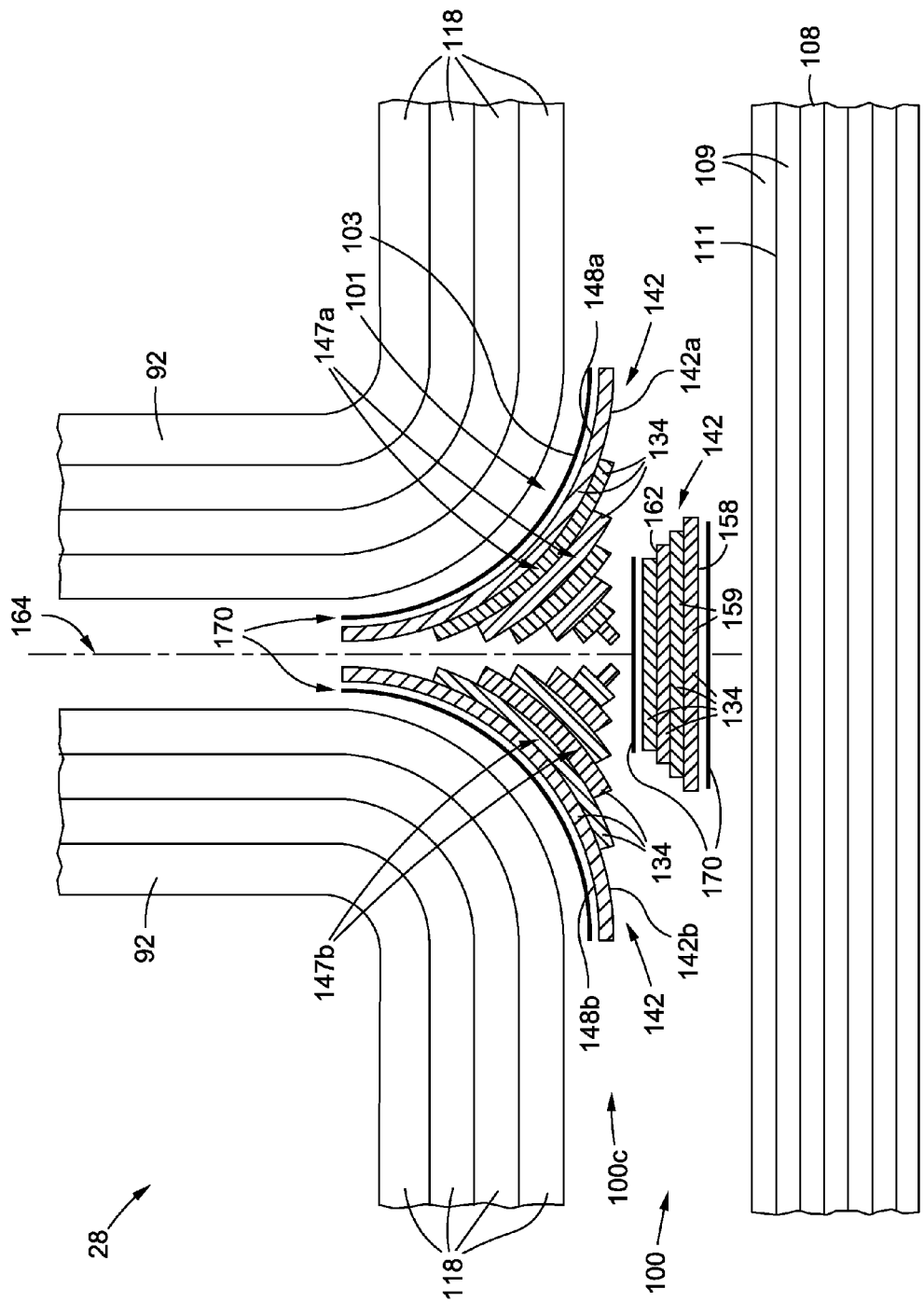
FIG. 9 is an illustration of an enlarged, front, exploded sectional view of another one of the embodiments of a composite radius filler of the disclosure; and, FIG. 10 is an illustration of a flow diagram of an exemplary embodiment of a method of the disclosure.

As shown in FIG. 10, the method 200 may further comprise the optional step 214 of applying one or more adhesive layers 170 (see FIG. 9) to the two or more radius laminates 142 (see FIG. 9) prior to cure of the composite radius filler 100 in order to facilitate load transfer in and out of each radius laminate 142 after cure of the composite radius filler 100. FIG. 9 is an illustration of an enlarged, front, exploded sectional view of another one of the embodiments of a composite radius filler 100, such as in the form of composite radius filler 100c, of the disclosure having one or more adhesive layers 170 applied to the composite radius filler 100, such as in the form of composite radius filler 100c, to increase bonding or adherence of the composite radius filler 100 to a composite structure 28 (see FIG. 9) and/or a composite web 108 (see FIG. 9).

The one or more adhesive layers 170 may preferably be applied before the composite radius filler 100 and the composite structure 28 are cured. The one or more adhesive layers 170 may comprise additional resin, epoxy adhesives, polyurethane adhesives, toughened acrylic adhesives, thermal adhesives such as polyamide-based adhesives (nylon), ionomers, or the like, or another suitable adhesive material.

In addition, adhesive layers 170 may be applied to the two or more radius laminates 142 prior to cure of the embodiments of the composite radius filler 100a (see FIG. 8C) and the composite radius filler 100b (see FIG. 8D), as necessary. For the composite radius filler 100a (see FIG. 8C) and composite radius filler 100b (see FIG. 8D), preferably, one or more adhesive layers 170 may be applied to the first side 144a (see FIGS. 8C-8D) of the first radius laminate 142a (see FIGS. 8C-8D) and to the second side 144b (see FIGS. 8C-8D) of the second radius laminate 142b (see FIGS. 8C-8D) to facilitate load transfer in and out of each radius laminate 142, such as first radius laminate 142a and second radius laminate 142b, after cure.

As shown in FIG. 9, the one or more adhesive layers 170 may be applied to the third radial side 148a of the first radius laminate 142a, the third radial side 148b of the second radius laminate 142b, to the bottom of the base 158 of a third radius laminate 162 and to the top of the third radius laminate 162. Further, one or more adhesive layers 170 (not shown) may be applied between the first radius laminate 142a and the second radius laminate 142b, as needed, to facilitate load transfer in and out of each radius laminate after cure.

FIG. 9 shows another embodiment of a tri-laminate composite radius filler comprising three radius laminates 142. As shown in FIG. 9, the three radius laminates 142 may comprise a first radius laminate 142a, a second radius laminate 142b (or alternatively, a first radius laminate 142c (see FIG. 8B) and a second radius laminate 142d (see FIG. 8B)), and a third radius laminate 162 (see FIG. 9). As shown in FIG. 9, the third radius laminate 162 comprises a base 158 and stacked composite plies 134 having a desired radial orientation 159 that preferably substantially matches a radial orientation 111 (see FIG. 9) of stacked composite plies 109 (see FIG. 9) of a composite web 108 (see FIG. 9). The third radius laminate 162 is preferably of a sufficient shape and size to be able to fit between and adjacent to the first radius laminate 142a and the second radius laminate 142b, respectively (or alternatively, to fit between and adjacent to first radius laminate 142c (see FIG. 8B) and second radius laminate 142d (see FIG. 8B), respectively). As shown in FIG. 9, the third radius laminate 162 may be centrally positioned between the first radius laminate 142a and the second radius laminate 142b, respectively, and along a central vertical axis 164 running between the first radius laminate 142a, the second radius laminate 142b, and the third radius laminate 162. The composite radius filler 100, such as in the form of composite radius filler 100c, preferably has a shape 101 (see FIG. 9) substantially corresponding to a radius filler region 116 (see FIG. 5B) of the composite structure 28 (see FIG. 9). The shape 101 may preferably comprise a substantially pyramid shaped configuration 103 (see FIG. 9). The composite radius filler 100, such as in the form of composite radius filler 100c, may preferably have a generally triangular cross-section.

As shown in FIG. 9, the first radius laminate 142a, the second radius laminate 142b, and the third radius laminate 162 are all aligned adjacent to each other to form a composite radius filler 100, such as in the form of composite radius filler 100c. As shown in FIG. 9, the first radius laminate 142a may be substantially aligned adjacent to the second radius laminate 142b. As further shown in FIG. 9, the third radial side 148a of the first radius laminate 142a is preferably positioned outward and is preferably adjacent to and corresponds to the surrounding composite structure 28. Preferably, the stacked composite plies 134, such as in the form of radially oriented stacked composite plies 147a, of the first radius laminate 142a substantially match a radial orientation 117 (see FIG. 5B) of adjacent stacked composite plies 118 (see FIG. 9) of the vertical web 92 of the composite structure 28 (see FIG. 9A) adjacent the first radius laminate 142a.

The third radial side 148b of the second radius laminate 142b is also preferably positioned outward and is also preferably adjacent to and corresponds to the surrounding composite structure 28. As shown in FIG. 9, the third radial side 148a is preferably positioned opposite the third radial side 148b. Preferably, the stacked composite plies 134, such as in the form of radially oriented stacked composite plies 147b, of the second radius laminate 142b substantially match a radial orientation 117 (see FIG. 5B) of adjacent stacked composite plies 118 (see FIG. 9) of the vertical web 92 of the composite structure 28 (see FIG. 9A) adjacent the second radius laminate 142b.

After the uncured composite radius filler 100 is formed by the method 200 disclosed herein, the uncured composite radius filler 100 may be cured before installation into the radius filler region 116 (see FIG. 5A) of the composite structure 28. Alternatively, the uncured composite radius filler 100 may be installed into the radius filler region 116 (see FIG. 5A) of the composite structure 28 (see FIG. 5A) and/or the composite assembly 26 (see FIG. 5B) and cured together with the composite structure 28 and/or composite assembly 26. The curing may comprise a known curing process such as an autoclave curing process, a vacuum bag curing process, a combination autoclave and vacuum bagging curing process, or another suitable curing process. The curing may take place at an elevated temperature and pressure as required per material specifications to effectively cure the composite radius filler 100 and the composite structure 28 and/or the composite assembly 26. During curing, the composite material of the composite radius filler 100 hardens, and if installed in the radius filler region 116 during cure, holds the shape of the radius filler region 116 within the composite structure 28 and/or composite assembly 26.

After curing the composite radius filler 100, if the cured composite radius filler 100 has been cured before installation into the radius filler region 116 (see FIG. 5A) of the composite structure 28 and/or the composite assembly 26, the cured composite radius filler 100 may be bonded or co-bonded within the radius filler region 116 of a cured or uncured composite structure 28 and/or composite assembly 26 via adhesive bonding, co-curing, secondary bonding, or another known bonding or co-bonding process. The bonding process may take place at an elevated temperature and pressure as required per material specifications to effectively bond or co-bond the cured composite radius filler 100 within the radius filler region 116 of a cured or uncured composite structure 28 and/or composite assembly 26.

Embodiments of the method 200 disclosed herein form a composite radius filler 100 (see FIG. 5A) that minimizes residual thermal stresses at three stress concentration points 106a, 106b, 106c (see FIG. 5A) of the composite radius filler 100 during heat cure of the composite radius filler 100. In addition, embodiments of the method 200 disclosed herein form a composite radius filler 100 (see FIG. 5A) that enhances a pull-off strength, and the stacked composite plies 134 (see FIG. 5A) of the composite radius filler 100 redistribute a pull-off load more evenly from a vertical web 92 (see FIG. 5A) to a horizontal flange 96 (see FIG. 5A) than known composite radius fillers or noodles.

Figure 4A:
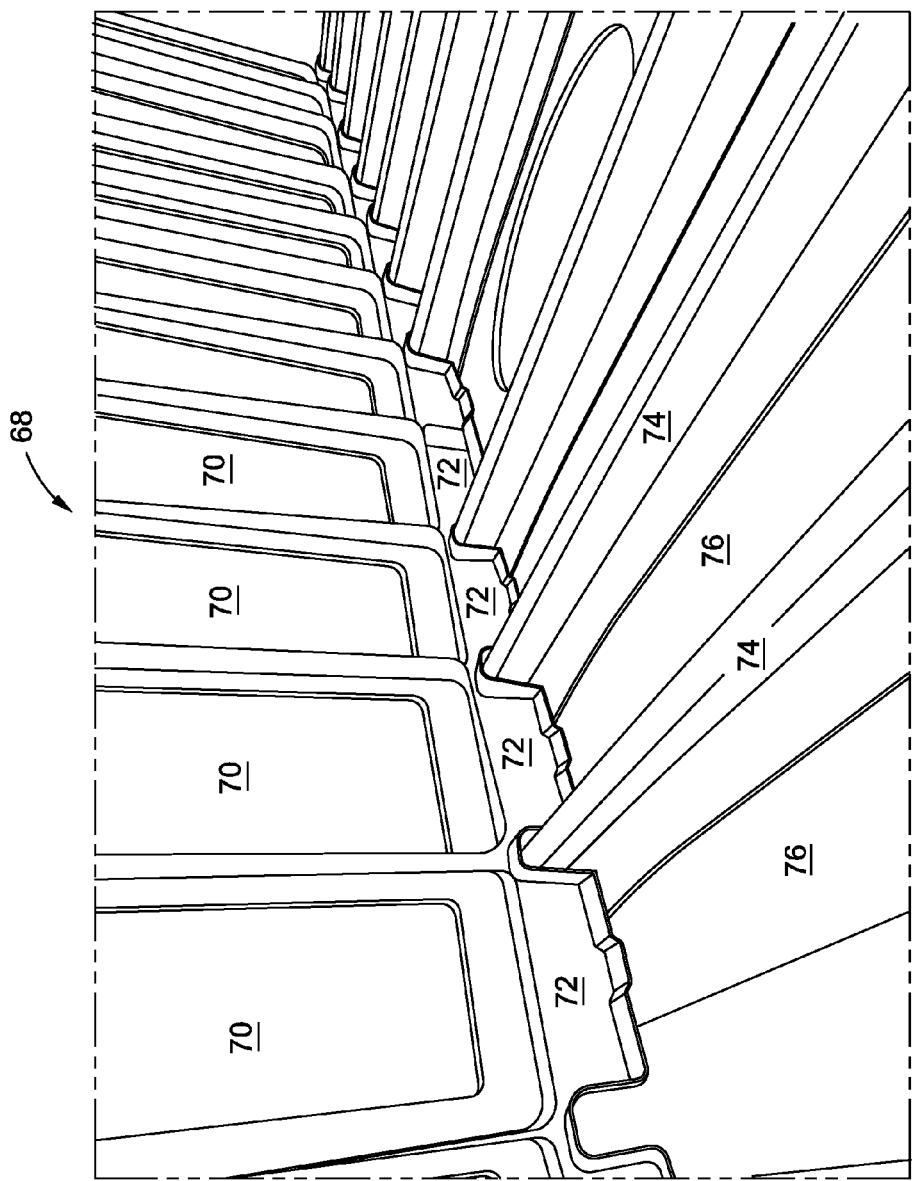
FIG. 4A is an illustration of a perspective view of a known shear tie and monolithic rib assembly for an aircraft wing.
Figure 4B:
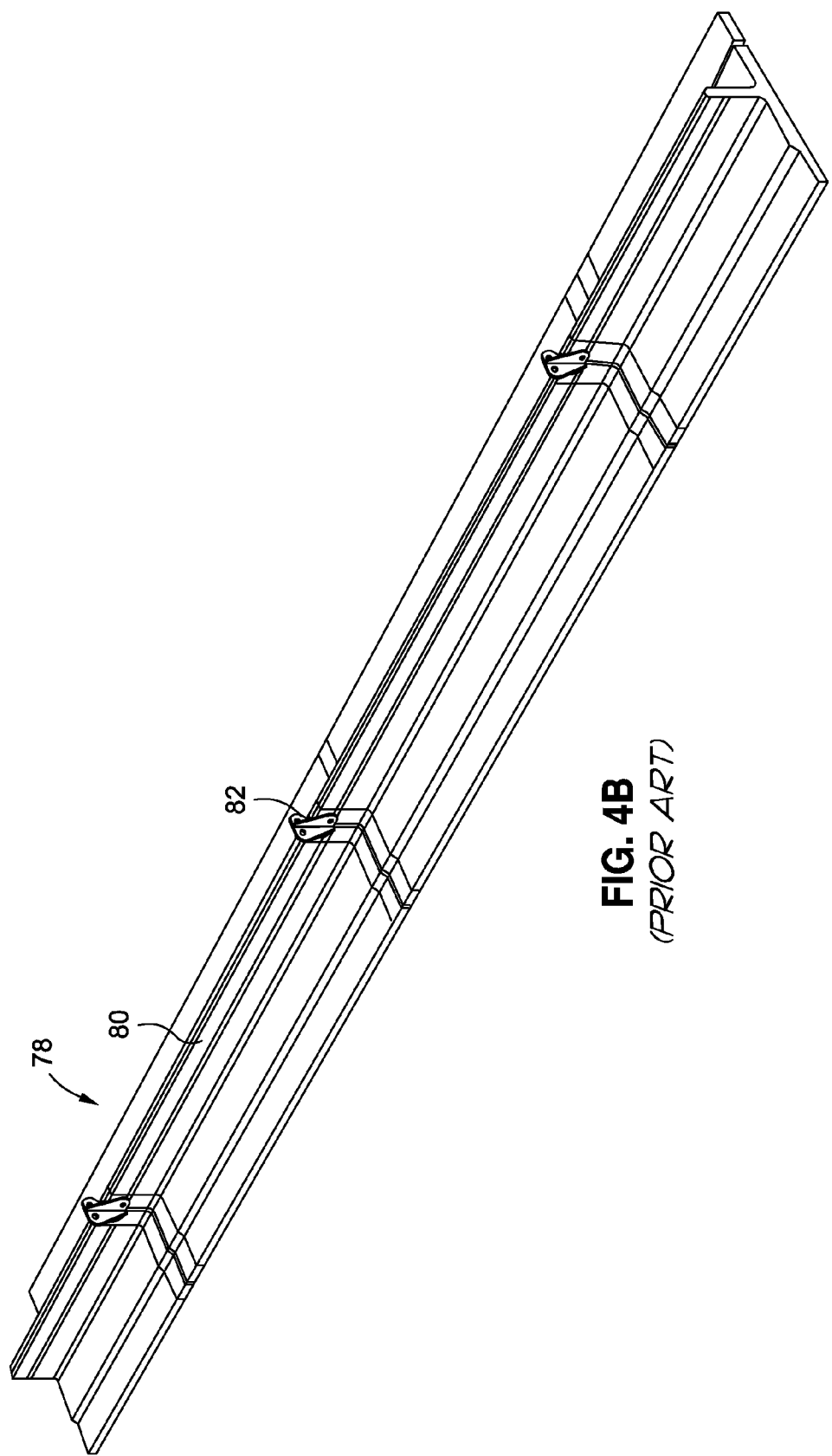
FIG. 4B is an illustration of a perspective view of a known shear tie and airload rib assembly for an aircraft wing.

In another embodiment of the disclosure, there is provided an aircraft 10 composite assembly 26 (see FIGS. 1, 5B). The aircraft 10 composite assembly 26 comprises a composite structure 28 (see FIGS. 1, 5A) having a radius filler region 116 (see FIG. 5B). The composite structure 28 may comprise a T-stiffener 90 (see FIGS. 5A-5B). The T-stiffener 90 may comprise a flange-web transition 97 (see FIG. 5A) in a spar 94 (see FIG. 5B) or a rib (see FIG. 4B), or an interface 102 (see FIG. 5A), such as a skin-stiffener interface. The aircraft 10 composite assembly 26 further comprises a composite radius filler 100 (see FIG. 5B) filling the radius filler region 116. The composite radius filler 100 preferably comprises two or more radius laminates 142 (see FIG. 5B). Each radius laminate 142 comprises a laminate 126 (see FIG. 6A) of stacked composite plies 134 (see FIG. 5B) formed in a desired radius 98 (see FIG. 5B) with a desired radial orientation 99 (see FIG. 5B) of the stacked composite plies 134 substantially matching a radial orientation 117 (see FIG. 5B) of adjacent stacked composite plies 118 (see FIG. 5B) of the composite structure 28 (see FIG. 5A), such as T-stiffener 90 (see FIG. 5B), surrounding the two or more radius laminates 142 of the composite radius filler 100. Each radius laminate 142 is preferably trimmed to have at least one side 144 (see FIG. 8B) align adjacent to the others to form the composite radius filler 100 having a shape 101 (see FIG. 5B) substantially corresponding to the radius filler region 116 (see FIG. 5B) of the composite structure 28 (see FIG. 5A).

In one embodiment, as shown in FIG. 8C, the two or more radius laminates 142 comprise a first radius laminate 142a aligned adjacent to a second radius laminate 142b to form the composite radius filler 100, such as in the form of composite radius filler 100a, having a shape 101 preferably comprising a substantially pyramid shaped configuration 103 and having a generally triangular cross-section. In another embodiment, as shown in FIG. 8D, the two or more radius laminates 142 comprise a first radius laminate 142a, a second radius laminate 142b, and a third radius laminate 152 all aligned adjacent each other to form the composite radius filler 100, such as in the form of composite radius filler 100b, having a shape 101 preferably comprising a substantially pyramid shaped configuration 103 and having a generally triangular cross-section. The third radius laminate 152 is preferably positioned at a portion 166 between the first radius laminate 142a and the second radius laminate 142b.

As will be appreciated by those of skill in the art, incorporating the novel composite radius filler 100 formed by embodiments of the disclosed method 200 into composite structures 28 (see FIG. 5A), e.g., an aircraft wing 18 (see FIG. 1) structure, results in a number of substantial benefits. Disclosed embodiments of the composite radius filler 100 (see FIG. 5A), 100a (see FIG. 8C), 100b (see FIG. 8D) and 100c (see FIG. 9), and method 200 (see FIG. 10) provide for matching the layup or stacking sequence of radial orientation of the stacked composite plies 134 of the radius laminates 142 to the radial orientation 117 (see FIG. 5B) of the stacked composite plies 118 (see FIG. 5B) of the surrounding composite structure 28 (see FIG. 5A), and in turn, closely matching the mechanical properties, such as performance and stiffness, of the composite radius filler 100 to the mechanical properties, such as performance and stiffness, of the surrounding composite structure 28. By radially orienting the stacked composite plies 134 of the radius laminates 142, thermal residual stresses at three stress concentration points 106a, 106b and 106c (see FIG. 5B) of the composite radius filler 100 may be minimized. The residual thermal stresses that may be created during the heat cure process may preferably be minimized with the composite radius fillers 100 disclosed herein due to the orthotropic nature of individual stacked composite plies 134 and due to the highest thermal stress locations at the three points or peaks of the composite radius filler 100 being moved away from the three points or peaks and moved toward the center of the composite radius filler 100. The composite radius fillers 100 disclosed herein preferably have high through-thickness thermal expansion in the z-direction common to the top peak or stress concentration point 106c (see FIG. 5A) of the composite radius fillers, as well as high through-thickness thermal expansion in the direction common to the bottom peaks or stress concentration points 106a, 106b (see FIG. 5A).

In addition, disclosed embodiments of the composite radius filler 100 (see FIG. 5A), 100a (see FIG. 8C), 100b (see FIG. 8D) and 100c (see FIG. 9), and method 200 (see FIG. 10) provide composite radius fillers 100 that minimize stress or fatigue cracking of the composite radius fillers 100 that may occur at low temperatures, such as less than −65 (minus sixty-five) degrees Fahrenheit and also allow for larger radius filler regions 116 (see FIG. 5A) to be formed. Further, disclosed embodiments of the composite radius filler 100 (see FIG. 5A), 100*a* (see FIG. 8C), 100*b* (see FIG. 8D) and 100*c* (see FIG. 9), and method 200 (see FIG. 10) provide composite radius fillers 100 that enhance pull-off strength and redistribute the pull-off load more evenly from the vertical webs 92 (see FIG. 5A) to the horizontal flanges 96 (see FIG. 5A) of the composite structure 28, and this, plus a reduced acceptable flaw size at a stringer-rib intersection may provide a higher pull-off capability. This may preferably eliminate the requirement for shear ties 72 (see FIG. 4A) on the monolithic ribs 70 (see FIG. 4A) at all but locations where high out-of-plane loads are transferred into the aircraft wing 18 (see FIG. 1), e.g., flap tracks or engine strut attachment locations.

Moreover, disclosed embodiments of the composite radius filler 100 (see FIG. 5A), 100*a* (see FIG. 8C), 100*b* (see FIG. 8D) and 100*c* (see FIG. 9), and method 200 (see FIG. 10) provide for cutting of uncured portions of the composite laminate layup 130 (see FIG. 8B) tangent to the forming tool 120 or mandrel 122 in four orthogonal cuts. This leaves four substantially pyramid shaped radius laminates 142 having a generally triangular cross-section that may be aligned in pairs adjacent to each other to form a composite radius filler 100 of the same shape and geometry as the void or volume of the radius filler region 116 in the composite structure 28, such as a T-stiffener 90 (see FIG. 5A) or a stringer 74 (see FIG. 4A). The unique composite radius filler 100 or "noodle" is formed by wrapping the laminate 126 of stacked composite plies 134 one or more times over a forming tool 120 such as a mandrel 122 (see FIG. 6A) and then cutting the excess portions of the composite laminate layup 130 (see FIG. 8A) away from the forming tool 120 until four radius laminates 142 are remaining around the forming tool 120. The four radius laminates 142 may then be removed and combined in pairs to make two (2) composite radius fillers 100 of a bi-laminate composite radius filler 100*a* (see FIG. 8C) or a tri-laminate composite radius filler 100*b* (see FIG. 8D) or another suitable composite radius filler. The disclosed embodiments of the composite radius filler 100 (see FIG. 5A), 100*a* (see FIG. 8C), 100*b* (see FIG. 8D) and 100*c* (see FIG. 9), and method 200 (see FIG. 10) may provide composite radius fillers 100 having increased structural properties to withstand even greater stresses and pull-off loads than are achievable with known composite radius fillers and noodles and may allow higher performance wings and other composite structures to be manufactured.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A composite radius filler for a composite structure comprising:
    two radius laminates forming the composite radius filler, each radius laminate having a triangular cross-section and comprising stacked composite plies that terminate in an abutting relationship with adjacent stacked composite plies of the other radius laminate, and each radius laminate having a desired radius with a desired radial orientation that substantially matches a radial orientation of stacked composite plies of a composite structure separate from the composite radius filler, and each radius laminate trimmed to have at least one side align adjacent to the others to form the composite radius filler having a shape substantially corresponding to a radius filler region formed in the composite structure.

2. The composite radius filler of claim 1 wherein the two radius laminates comprise a first radius laminate aligned adjacent to a second radius laminate to form the composite radius filler having a substantially pyramid shaped configuration.

3. The composite radius filler of claim 1 wherein the composite radius filler comprises two or more radius laminates comprising a first radius laminate, a second radius laminate, and a third radius laminate all aligned adjacent to each other to form the composite radius filler having a substantially pyramid shaped configuration, the third radius laminate positioned at a portion between the first radius laminate and the second radius laminate.

4. The composite radius filler of claim 1 wherein the stacked composite plies are in a form selected from the group consisting of a prepreg unidirectional tape, a unidirectional fiber tape, a carbon fiber-reinforced plastic (CFRP) tape, a carbon fiber-reinforced plastic (CFRP) fabric, a prepreg fabric, a woven fabric including a woven carbon fiber fabric, and a combination thereof.

5. The composite radius filler of claim 1 wherein each radius laminate is removed from a composite laminate layup via cuts made tangent to one or more surfaces of a forming tool wrapped with the composite laminate layup.

6. The composite radius filler of claim 1 wherein the desired radial orientation of the stacked composite plies of each radius laminate is selected to substantially match the coefficient of thermal expansion at three stress concentration points of the composite radius filler to that of the adjacent stacked composite plies of the composite structure surrounding the composite radius filler to minimize cracking of the composite radius filler from residual thermal stresses.

7. An aircraft composite assembly comprising:
    a composite structure having a radius filler region;
    a composite radius filler filling the radius filler region, the composite radius filler comprising:
    two radius laminates forming the composite radius filler, each radius laminate having a triangular cross-section and comprising stacked composite plies that terminate in an abutting relationship with adjacent stacked composite plies of the other radius laminate, and each radius laminate having a desired radius with a desired radial orientation that substantially matches a radial orientation of adjacent stacked composite plies of the composite structure separate from the composite radius filler and surrounding the composite radius filler formed by the two radius laminates, and each radius laminate of the composite radius filler trimmed to have at least one side align adjacent to the others to form the composite radius filler having a shape substantially corresponding to the radius filler region formed in the composite structure.

8. The aircraft composite assembly of claim 7 wherein the two radius laminates comprise a first radius laminate aligned adjacent to a second radius laminate to form the composite radius filler having a substantially pyramid shaped configuration.

9. The aircraft composite assembly of claim 7 wherein the composite radius filler comprises two or more radius laminates comprising a first radius laminate, a second radius laminate, and a third radius laminate all aligned adjacent to each other to form the composite radius filler having a substantially pyramid shaped configuration, the third radius laminate positioned at a portion between the first radius laminate and the second radius laminate.

10. A method of forming a composite radius filler comprising the steps of:
   wrapping a laminate of stacked composite plies one or more times about a forming tool having a desired radius to form a composite laminate layup of a desired thickness;
   debulking the composite laminate layup to remove voids;
   aligning all splices of the composite laminate layup at one or more desired portions to be removed from the composite laminate layup;
   removing the one or more desired portions from the composite laminate layup in one or more cuts tangent to one or more surfaces of the forming tool;
   removing from the forming tool two radius laminates of the composite laminate layup; and,
   aligning the two radius laminates together to form a composite radius filler having a shape substantially corresponding to a radius filler region of a composite structure, each radius laminate having a triangular cross-section and comprising stacked composite plies that terminate in an abutting relationship with adjacent stacked composite plies of the other radius laminate, and each radius laminate having a desired radius with a desired radial orientation that substantially matches a radial orientation of stacked composite plies of the composite structure separate from the composite radius filler.

11. The method of claim 10 further comprising applying one or more adhesive layers to the two radius laminates prior to cure of the composite radius filler in order to facilitate load transfer in and out of each radius laminate after cure of the composite radius filler.

12. The method of claim 10 wherein the wrapping step comprises continuously wrapping the laminate of stacked composite plies multiple times about the forming tool to form the composite laminate layup of the desired thickness.

13. The method of claim 10 wherein the wrapping step comprises wrapping the laminate of stacked composite plies one time about the forming tool and either butt splicing or lap splicing the laminate of stacked composite plies to form the composite laminate layup of the desired thickness.

14. The method of claim 10 further comprising after the debulking step, repeating each of the wrapping step and the debulking step one or more additional times to obtain the composite laminate layup of the desired thickness.

15. The method of claim 10 wherein the aligning all splices step comprises aligning the splices of the composite laminate layup at one or more of a 12 o'clock position, a 3 o'clock position, a 6 o'clock position, and a 9 o'clock position on the composite laminate layup.

16. The method of claim 10 wherein the removing the one or more desired portions step comprises making four orthogonal cuts to form a substantially square configuration about the forming tool.

17. The method of claim 10 wherein the aligning the two radius laminates step comprises aligning a first radius laminate with a second radius laminate adjacent to each other to form the composite radius filler having a substantially pyramid shaped configuration.

18. The method of claim 10 wherein the aligning step further comprises aligning two or more radius laminates comprising aligning a first radius laminate, a second radius laminate, and a third radius laminate adjacent to each other to form the composite radius filler having a substantially pyramid shaped configuration, the third radius laminate positioned at a portion between the first radius laminate and the second radius laminate.

19. The method of claim 10 wherein the aligning the two radius laminates step comprises forming the composite radius filler to minimize residual thermal stresses at three stress concentration points of the composite radius filler during heat cure of the composite radius filler.

20. A composite radius filler formed by the method of claim 10.

* * * * *